(12) United States Patent
Meertens et al.

(10) Patent No.: US 12,394,209 B2
(45) Date of Patent: Aug. 19, 2025

(54) METHOD, PROCESSING UNIT AND RECORDING SYSTEM FOR GENERATING ENCODED TRAINING DATA FOR A MACHINE LEARNING PROCESS

(71) Applicant: ARGO AI GMBH, Munich (DE)

(72) Inventors: Roland Meertens, Munich (DE); Sergei Nikiforov, Stockholm (SE)

(73) Assignee: Volkswagen Group of America Investments, LLC, Reston, VA (US)

( * ) Notice: Subject to any disclaimer, the term of this patent is extended or adjusted under 35 U.S.C. 154(b) by 177 days.

(21) Appl. No.: 18/270,106

(22) PCT Filed: Feb. 21, 2022

(86) PCT No.: PCT/EP2022/054245
§ 371 (c)(1),
(2) Date: Jun. 28, 2023

(87) PCT Pub. No.: WO2022/175524
PCT Pub. Date: Aug. 25, 2022

(65) Prior Publication Data
US 2024/0062552 A1   Feb. 22, 2024

(30) Foreign Application Priority Data
Feb. 22, 2021   (EP) .................................... 21158482

(51) Int. Cl.
*G06V 20/56*   (2022.01)
*G06T 9/00*   (2006.01)
*G06V 10/60*   (2022.01)

(52) U.S. Cl.
CPC ................ *G06V 20/56* (2022.01); *G06T 9/00* (2013.01); *G06V 10/60* (2022.01); *G06V 2201/07* (2022.01)

(58) Field of Classification Search
CPC ......... G06F 18/214; G06T 9/00; G06V 10/60; G06V 10/774; G06V 20/56; G06V 2201/07
See application file for complete search history.

(56) References Cited

U.S. PATENT DOCUMENTS 5,912,986 A * 6/1999 Shustorovich ....... G06V 30/146
382/156
10,322,728 B1 * 6/2019 Porikli .................. G06V 10/80
(Continued)

FOREIGN PATENT DOCUMENTS

EP   3633990 A1   4/2020

OTHER PUBLICATIONS

International Search Report and Written Opinion for PCT/EP2022/054245 dated Jun. 10, 2022, 16 pages.

*Primary Examiner* — Peter D Le
(74) *Attorney, Agent, or Firm* — Fox Rothschild LLP

(57) ABSTRACT

The invention is concerned with a method for generating encoded training data, wherein a processing unit performs the following steps for generating the encoded training data (11) and for storing them into a data storage during a test drive of a test vehicle that carries a camera that is generating raw image data. It is tested, if a given video encoder is suitable for encoding the raw image data for generating the encoded training data for a training of another, second artificial neural network, by performing a testing procedure.

14 Claims, 3 Drawing Sheets

(56) References Cited

U.S. PATENT DOCUMENTS

| | | | |
|---|---|---|---|
| 11,157,741 B2* | 10/2021 | Freitas Cunha | H04W 4/029 |
| 2020/0309541 A1 | 10/2020 | Lavy et al. | |
| 2020/0320344 A1* | 10/2020 | Ma | G06N 3/08 |
| 2020/0320748 A1* | 10/2020 | Levinshtein | G06V 10/454 |
| 2020/0355820 A1* | 11/2020 | Zeng | G01S 13/865 |
| 2021/0004670 A1* | 1/2021 | Tripathi | G06N 3/084 |
| 2021/0149946 A1* | 5/2021 | VanBlon | G06T 11/60 |
| 2021/0183030 A1* | 6/2021 | Meng | G06V 10/451 |
| 2021/0397988 A1* | 12/2021 | Sarpatwar | G06N 3/04 |
| 2022/0092404 A1* | 3/2022 | O'Connor | G06F 18/214 |
| 2022/0301348 A1* | 9/2022 | Bradley | G06T 17/20 |

* cited by examiner

METHOD, PROCESSING UNIT AND RECORDING SYSTEM FOR GENERATING ENCODED TRAINING DATA FOR A MACHINE LEARNING PROCESS

CROSS-REFERENCE TO RELATED APPLICATIONS

This application is a U.S. National Stage entry under 35 U.S.C. § 371 based on and claiming priority to International Application No. PCT/EP2022/054245, filed Feb. 22, 2022, which was published under International Publication No. WO 2022/175524, and which in turn claims priority to European Patent Application No. 21158482.6, filed Feb. 22, 2021. The disclosures of the priority applications are incorporated into this document by reference.

BACKGROUND

In an autonomously driving vehicle (ADV), an artificial neural network (ANN) may be used to observe the environment of the vehicle by evaluating image data representing images generated by a camera. To this end, the ANN may be connected to the camera for receiving the raw image data of a camera image stream. The term "raw" means that no image encoding like MPEG-encoding is applied (MPEG—moving picture experts group). However, the raw image data may already be processed by other algorithms, though, like, for example, an edge detection algorithm. The ANN is trained to recognize or infer objects in the raw image data. As raw image data are used, no image encoding artifacts are expected by the ANN.

For training such an ANN, training data is needed. The training data may be generated by mounting a camera on a car and recording the camera images to a data storage during test drives. As a large amount of training data is needed, storing the raw camera image data stream would require a large data storage (several Terabytes) and handling such an amount of data (e.g. a transfer to other computers) would be time consuming. The camera image data stream must therefore be compressed to reduce the amount of data. This is obtained by encoding the raw camera images before storing them in the data storage of the car. A possible encoder is MPEG (MP4 or H.264/MPEG-4 AVC or ISO/IEC-14496). The data storage thus contains encoded image data.

The consequence is that for training the ANN, only encoded image data is available, but during the later use of the trained ANN in an ADV, the ANN must perform on raw (un-encoded) image data. Encoding image data is a "lossy" process, i.e. the encoded camera images might contain artifacts that are introduced by the encoding. The ANN might therefore exhibit an unexpected behavior. Simply also using an encoder in the ADV is no option as the highest resolution and therefore the highest object recognition probability is obtained with raw camera images.

A scientific publication by Blundell et al. (C. Blundell, J. Cornebise, K. Kavukcuoglu, D. Wierstra, "Weight Uncertainty in Neural Networks", ICML 2015, Proceedings of the 32nd International Conference on Machine Learning, Lille, France, 2015. JMLR: W&CP volume 37, available on the internet page https://deepmind.com/research/publications/weight-uncertainty-neural-networks/) describes an uncertainty measure that can be used to quantify an uncertainty or definiteness of a recognition result delivered by an artificial neural network. Other uncertainty measures are also known in the prior art.

Document US 2018/0 107 182 A1 discloses a method for recognizing different flying vehicles (drones) on the basis of camera images that are analyzed by an artificial neural network. As an additional feature, audio recordings of the sounds of the engines of the drones may also be analyzed by the neural network as drones produce characteristic individual sounds. With regard to the data connection between the camera and the neural network, it is mentioned that raw data or processed data may be transmitted.

Document EP 3 633 990 A1 discloses a system for tuning parameters of an encoder in order to optimize a predefined distortion metric. One possible distortion metric is based on comparing a recognition result for raw image data with a recognition result for encoded and then decoded image data.

Document US 2020/0 309 541 A1 discloses a vehicle that is equipped with a camera for generating image data that will be stored in a storage device of a training server for a SLAM algorithm.

An internet publication by Michel Kana (Michel Kana, Ph.D, "Uncertainty in Deep Learning. How To Measure?", https://towardsdatascience.com/") describes different uncertainty measures for determining an uncertainty level of an artificial neural network.

An internet publication by Avinash Sharma V (Avinash Sharma V, "Understanding Activation Functions in Neural Networks", https://medium.com/) describes an activation function that may be used in the artificial neurons of the layers of an artificial neural network for generating activation values.

SUMMARY

The invention is concerned with a method for generating encoded training data for a machine learning process. The encoded training data are image data that have been encoded by a video encoder. The encoded training data may be used for training an artificial neural network (ANN) such that the artificial neural network may be enabled to recognize at least one object on the basis of camera image data. The invention also comprises a processing unit for performing the method and a recording system for recording encoded training data.

The object of the present invention is to obtain suitable training data for training an ANN for object recognition.

The object is accomplished by the subject matter of the independent claims. The invention is defined by the independent claims. Advantageous developments with convenient and non-trivial further embodiments of the invention are specified in the following description, the dependent claims and the figures.

DETAILED DESCRIPTION

Figure 1:
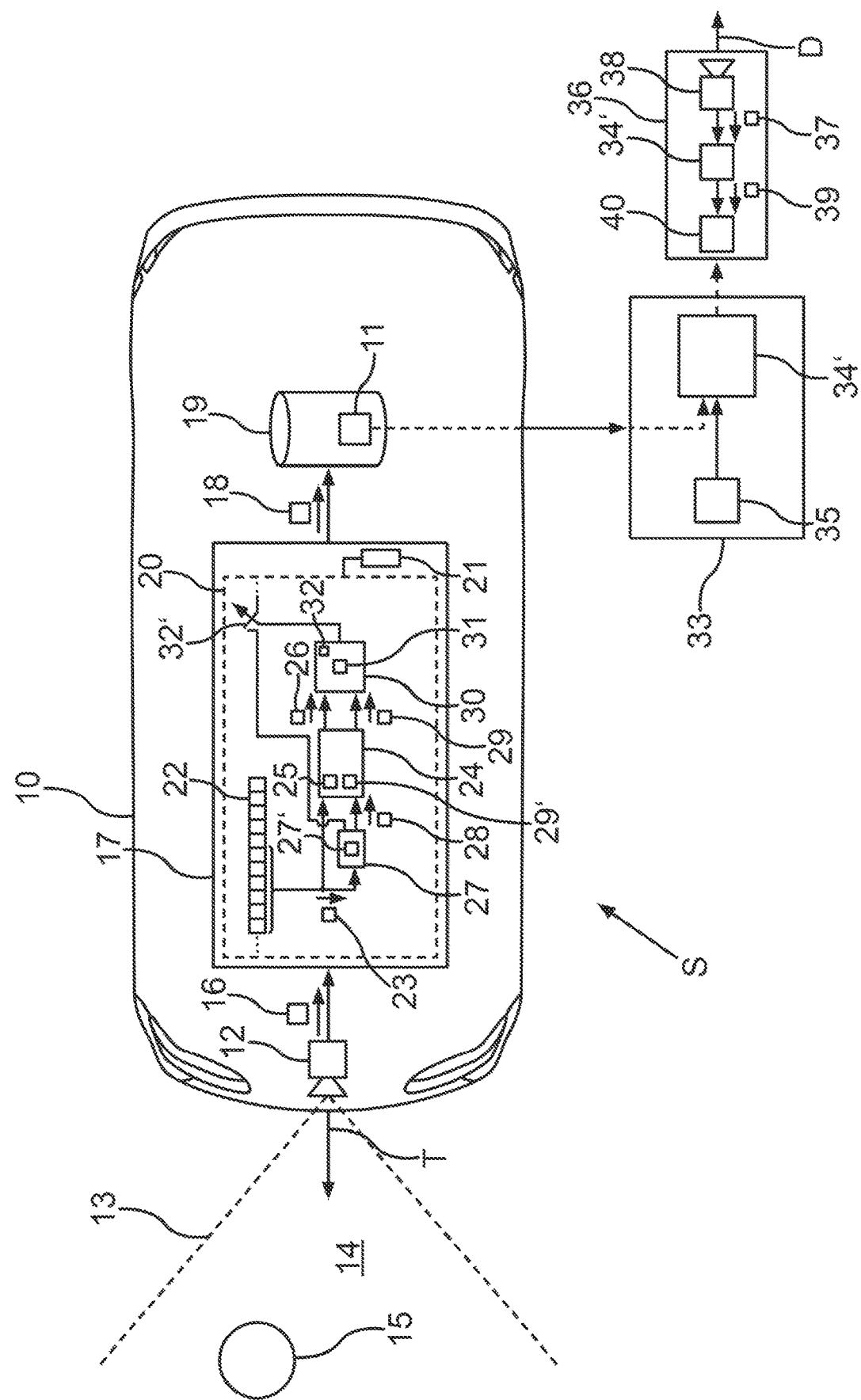
FIG. 1 is a schematic illustration of an embodiment of the inventive motor vehicle.

The invention provides a method for generating encoded training data that may be used for machine learning. These training data are image data that are encoded by an image encoder or video encoder for by applying a so-called lossy compression of the image data. "Lossy" means that after decompressing the image data, the images differ from the original version, as image details, like color shadings and/or lines, are missing or blurred, i.e. encoding/decoding artifacts may be contained in the images after decoding them for performing a recognition process. The training data may nevertheless be used for machine learning, for example for training an artificial neural network. This requires a suitable video encode with suitable preset values.

According to the method, a processing unit performs the following steps for generating and storing the encoded training data into a data storage during a test drive of a test vehicle that carries a camera which is generating raw camera image data. "Test vehicle" means that this vehicle does not have to provide an autonomous driving functionality itself. The test vehicle may be used for gathering the encoded training data only.

According to one aspect, the invention provides a method for generating encoded training data that may be used for machine learning. A processing unit performs the following steps for generating the encoded training data and storing them into a data storage during a test drive of a test vehicle that carries a camera that is generating raw image data.

The method comprises the following steps. The processing unit received the raw image data from the camera. The method is based on an artificial neural network (ANN) that has been trained on (other) raw image training data. This ANN may be operated in the test vehicle or outside the test vehicle (for example in a server that the vehicle or processing unit may connected to via an internet connection). In other words, the training of the ANN has already been finished using previously obtained raw image training data from another source.

Using the ANN, a recognition test or image recognition is performed on the basis of the received raw image data is performed and thereby reference recognition data or reference evaluation data is generated on the basis of a predefined evaluation rule. The evaluation rule may state of define which part of the recognition result shall be used as recognition data/evaluation data. In other words, the ANN is provided with at least one subset or data sequence of the raw image data as an input and the reference evaluation data or reference recognition data describe how the ANN reacts to these raw image data. The evaluation rule determines what type of evaluation data shall be used which is explained in further detail below. In other words, the evaluation rule determines which one of these quantities: an image content that has been recognized in the at least one data sequence and/or activation values of at least one hidden layer of the ANN and/or a value of a predefined uncertainty measure regarding the image content is to be used or generated for use in the following step.

The objective is achieved by performing a recognition test or image recognition on the basis of at least one data sequence of the received raw image data using the ANN and thereby generating respective reference recognition data or reference evaluation data on the basis of the predefined evaluation rule.

For each data sequence it is tested, if a given encoder (video encoder) is suitable for encoding the raw image data as the encoded training data for a training of a second artificial neural network, i.e. another artificial neural network. This is achieved by performing a testing procedure comprising that the respective data sequence of the raw image data is encoded with the encoder and then the encoded image data is decoded with a corresponding decoder and an image recognition or recognition test is performed on the decoded image data yielding current recognition or evaluation data and the processing unit verifies, if the current evaluation data and the respective reference recognition data (reference evaluation data) fulfill a predefined similarity criterion. Only if the predefined similarity criterion is fulfilled, it can be signaled that the currently used encoder (video encoder) is suitable for generating encoded training data. The reason for this is that the fulfilled similarity criterion confirms that despite the encoding and decoding of the image data the recognition result is similar (in the sense of the similarity criterion) to the one that result from the raw image data.

The invention also comprises embodiments that provide features which afford additional technical benefits.

One embodiment may be used for systematically finding or deriving a suitable video encoder in a selection loop. The embodiment comprises that the inventive method selects at least one suitable preset value for an encoder (video encoder) and/or selects one out of several prepared encoders (video encoders) such that encoded training data may be provided that allow for training the ANN (second ANN) in such a way that the ANN may later be used in connection with un-encoded, i.e. raw camera image data without or with only a pre-defined limited loss of recognition power (i.e. limited change in behavior is guaranteed).

The reference recognition data or reference evaluation data may serve as a reference or base-line for finding such a suitable encoder and/or a suitable preset value for the encoder such that the raw image data (and further raw image data) may be encoded such that the resulting encoded image data are still usable as training data for a new (second) ANN that shall later be operated in connection with an autonomous driving function.

This selection of a suitable preset value is performed in a selection loop, i.e. in an iterative or looped process: The current data sequence taken from the raw image data is encoded with a current encoder that is selected from a predefined set of possible (video) encoders and/or with a current preset value that is selected from a predefined set of possible preset values for the current (video) encoder. One example of such a possible encoder is the already mentioned MPEG-4-encoder (i.e. ISO/IEC-14496). One example for a possible preset value is for the encoding parameter "GOP-value" (GOP—group of pictures). It is noted here that only one single "preset value" is mentioned here, but this does not exclude that at least one further current preset value may be present. In other words, if several encoding parameters of the encoder shall be varied, a respective preset value for each encoding parameter may be used. For the sake of simplicity, only one current preset value is mentioned, although this preset value may represent several different preset values (one for each specific encoding parameter of the encoder). The predefined set of encoders may be a list of available encoders, the predefined set of preset values may be, e.g. an interval or a range of numbers (e.g. GOP in the range from 1 to 10).

Then, the encoded image data is decoded again using the corresponding decoder. This yields decoded image data that describe at least one image with the possible encoding artifacts. The recognition test or image recognition is performed again using the ANN, but this time for the decoded image data or testing data and thereby generating current recognition or evaluation data on the basis of the evaluation rule. Now, in addition to the reference recognition data or reference evaluation data, current or intermediate evaluation data are available, wherein here "current" or "intermediate" refers to the current choice of encoder and/or preset value.

The processing unit then verifies whether the current evaluation data fulfill a predefined similarity criterion with regard to the reference recognition data or reference evaluation data. By choosing the similarity criterion, the skilled person can set the conditions under which an encoder and/or preset value is regarded to be acceptable for encoding training data.

If the similarity criterion is fulfilled, the selection loop is interrupted or ended and the current encoder and the current preset value is used for generating encoded training data by encoding the received and/or future raw image data for a future time interval during the test drive.

It is noted here that the invention is concerned with the recording process for storing or writing encoded image data in a data storage, where only an already trained network ANN can be operated. In the case of the invention, the raw-image recognition may even yield wrong results, as all what is monitored is how similar the recognition results are. The ground truth is not available.

In the opposite case, i.e. if the similarity criterion is un-fulfilled, a predefined selection step for selecting another encoder (video encoder) and/or other preset values is performed and the selection loop is repeated. In other words, the search for a suitable encoder and/or preset value (that fulfills the similarity criterion) is continued. Note that for the first iteration of the selection loop, the choice or selection of the encoder and/or the preset value may be based on a default value or a random value.

The invention provides the benefit that the encoding is configured automatically during a test drive. The choice for the encoder and/or preset value is adapted to the current recording conditions (e.g. the current light conditions) in an automated manner.

If no encoder and/or preset value can be found (i.e. the set of encoders and/or the set of preset values is completely searched by the selection loop without success), the recording may be halted or the raw image data may be recorded instead of encoded image data. The latter embodiment ensures that training data is available in any case.

In one embodiment, the processing unit repeatedly detects an environmental condition in an environment of the test vehicle on the basis of environmental data and if a predefined change in the environmental condition is detected during the recording of the training data, a predefined switching procedure for adapting the encoding to the current environmental conditions is performed. Examples for environmental conditions are: sunshine, rain, fog, a specific brightness value of the light, angle of incidence of the light. The environmental data that are used for detecting the current environmental condition may comprise sensor data from at least one sensor of the test vehicle, e.g. from a rain sensor and/or the raw image data and/or at least one automized parameter of the camera (e.g. duration of exposure). The environmental data may comprise data from a data information service, e.g. a weather forecast service. Such a data information service may be provided by an internet server that the processing unit may be connected to via an internet connection. A change in the environmental condition may be detected on the basis of a threshold comparison and/or by using a classification result of a statistical classifier, e.g. an artificial neural network, for classifying the environmental data.

In one embodiment, said switching procedure comprises that several possible environmental conditions are each associated with a respective encoder from the set of encoders and/or with a respective preset value from set of possible environmental set values. If the current environmental condition matches one of the possible environmental conditions, the associated encoder and/or preset value is used for the further encoding. In other words the processing unit is already prepared for several different environmental conditions. This reduced the reaction time it takes to adapt the encoding to a change in the environmental condition.

In one embodiment the evaluation rule for determining the evaluation data (reference evaluation recognition data and "current" evaluation data) comprises that a full recognition result is comprised in the evaluation data, i.e. a recognition result that states what objects have been detected or recognized. The similarity criterion comprises that a predefined percentage of the recognition statistics must agree. For example, the similarity criterion may state that a predefined percentage value (e.g. in the range of 80% to 99%) of predefined objects (e.g. pedestrians) detected on the basis of the raw image data shall also be detected on the basis of the encoded image data. This provides the benefit that the actual recognitions results are compared.

Additionally or alternatively, the evaluation rule comprises that activation values of at least one hidden layer of the ANN and/or an uncertainty level of the artificial neural network are comprised in the reference recognition data and in the current evaluation data and the similarity criterion comprises that a difference in the reaction of the ANN to the encoded image data in comparison to the raw image data is below a predefined threshold. This requires can be based the processing of a predefined number of images (e.g. less than 100 or less than 50 or less than 10) or video sequences of limited length (e.g. less than 10 seconds or less than 3 seconds). This may saves time for performing the selection loop.

In one embodiments said selection step comprises that the possible preset values are ordered (e.g. increasing order or decreasing order). The selection of the current preset value is based on a gradient descent algorithm. In other words a difference between the reference recognition data (reference evaluation data) and the current evaluation data is reduced or minimized by changing the preset value in a descending or increasing manner such that a stepwise reduction of the difference is achieved. This leads to a systematic derivation of a suitable preset value.

In one embodiment the selection step is based on multi-pass encoding, wherein in a first pass (initial iteration of the selection loop) an activation level (activation values) of the ANN for single sequences of camera images is recorded and in one or several following passes (iteration of the selection loop) the preset value is varied such that an influence on those images or sequences with low activation level is increased. This has proven to be an efficient way of deriving a suitable preset value for a current environmental condition.

One aspect of the invention is concerned with preventing encoded image data from being stored as encoded training data, if the encoded image data are not suitable for a training process.

One embodiment comprises that the processing unit receives the raw image data from the camera and selects at least one data sequence from the raw image data. A sequence is an array or subset of the raw image data. Each sequence therefore comprises a part or subset of the received raw image data. A sequence may represent several consecutive images of a video stream output by the camera. Alternatively, a sequence of raw image data may represent a single still image. For each sequence of raw image date, the following steps are performed. A first image recognition is performed on that sequence using an artificial neural network that is trained to recognize at least one object on the basis of the raw image data. Like has already been explained, the training of that ANN was performed using other previously recorded raw image data. "Recognizing" means, that the at least one object will be detected (existence or presence is signaled) and/or classified (an object type or object class may be identified) on the basis of the raw image data. This process is termed here "image recognition" or inference. The artificial neural network can be a data structure and/or algorithm for processing the input data (raw image data) for obtaining output data or recognition data that describe an image content of the input data, i.e. they provide said information about the at least one object. The training of the artificial neural network may be based on raw image data that have been labelled such that the raw image data for the training are accompanied by labelling data that indicate the true image content. This type of training process for an artificial network is known from the prior art.

From performing the first image recognition on the sequence of raw image data, reference recognition data (reference evaluation data) are obtained as a result of performing the first image recognition. It is therefore known, what the recognition result should be, if the artificial neural network performs the image recognition on the un-encoded or non-encoded image data of the sequence.

In a further step, the sequence is encoded on the basis of or with an image encoder or video encoder that is configured with given preset values. In other words, a pre-configured image encoder or video encoder is used for encoding the image data of the sequence. Note that "image encoder" and "video encoder" are used here as synonyms. After the encoding (and after decoding the encoded image sequence with the corresponding decoder), a second image recognition is performed on that encoded and then decoded sequence using said artificial neural network. In other words, the image recognition process is repeated, but encoded image data are used after decoding them again, i.e. the deencoded image data or decoded sequence. As a result of performing the second image recognition, second recognition data are obtained that are also referred to as current evaluation data.

If these second recognition data (current evaluation data) on one hand and the afore-mentioned reference recognition data (reference evaluation data) on the other hand fulfill a the predefined similarity criterion, the video encoder is suitable for encoding the image data of the camera, as the artificial neural network behaves "similarly" in the boundaries as defined by the similarity criterion. The fulfilled similarity criterion signals or indicates that using the video encoder does not have a detrimental effect on the performance of the artificial neural network, if it was trained with the decoded image data instead of raw image data. Therefore, the image encoder with its current preset values is regarded as suitable for encoding image data that shall later be used as encoded training data for training another artificial neural network, i.e. said second artificial neural network. The image encoder with its current preset values may therefore be used for encoding raw image data and storing the encoded raw image data in the data storage. Thus, the encoded sequence is stored as the encoded training data (for later use in a training process). If the similarity criterion is fulfilled, the artificial neural network provides a similar recognition result for the encoded sequence (after decoding it) as it does for the non-encoded or raw sequence. "Similar" is defined by the choice or set-up of the similarity criterion. The skilled person can choose the limits for what is still regarded as "similar". Additionally or alternatively, even further raw image data are encoded and the encoded further raw image data are also stored as the encoded training data in the data storage. In other words, the video encoder is operated for encoding further raw image data for obtaining more encoded training data.

Thus, based on the current preset data, image data are encoded and stored, that are identified as being suitable for using them as encoded training data. However, if the similarity criterion is not fulfilled, i.e. if the similarity criterion is violated, preferably no storing of image data in the data storage is performed. This saves data storage space in the data storage.

Therefore, during a test drive, the raw camera images as generated by a camera are only encoded and stored to the data storage, if from the encoding such encoded training data result that will provide recognition results that are similar (according to the similarity criterion) to the recognition results obtained by or from raw image data (reference recognition data or reference evaluation data). The storing may be stopped, when it becomes clear or when it is detected that the stored data would be of no use as training data (because they violate the similarity criterion). Alternatively, the storing may continue, but the raw image data may be stored instead of encoded image data.

Said processing unit for performing the method can be based on at least one microprocessor coupled to a memory that contains computer-readable instructions which will cause the at least one microprocessor to perform the inventive method when executed by the at least one processor.

The invention also comprises embodiments that provide features which afford additional technical advantages.

In one embodiment the storing of data in the data storage is controlled in such a way that if and/or while the similarity criterion is violated, i.e. not fulfilled, an already ongoing storing of encoded image data is interrupted or stopped (if such a storing is ongoing). In other words, the storing of encoded image data is only performed while the similarity criterion is fulfilled. Preferable, the similarity criterion is verified for all raw image data. However, it may also be the case that only samples of raw image data are used as the sequences. Then, the storing may continue until a sequence is detected that violates the similarity criterion. The latter is the case, when the similarity criterion is verified for a sequence and from then on, if this sequence fulfils the similarity criterion, the video encoder is used for encoding the image data following that sequence unit a sequence is detected that violated the similarity criterion. The storing may be interrupted until the next sequence is detected that fulfils the similarity criterion again. Then the storing may continue. This generates an on-and-off switching effect for the storing process.

In one embodiment, for the case that the similarity criterion is not fulfilled, the preset values of the video encoder are adapted according to a predefined adaptation rule. In other words, if it is detected that the video encoder is not suitable for generating encoded training data (in particular in the present situation), the preset values of the video encoder are adapted or changed. For example, the adaptation rule may comprise that a stepwise increase or decrease of at least one parameter value of the preset value is performed. Additionally or alternatively, the adaptation rule may comprise that the preset values are adapted as a function of the second recognition data or evaluation data. In other words, the adaptation rule may react to or consider the second recognition result, i.e. the second recognition data or evaluation data. This embodiment may be based on a gradient-decent method. The adaptation rule may lead to preset values that enable the video encoder to provide encoded image data that fulfill the similarity criterion.

In a further development, an iterative improvement or adaptation of the preset values may be provided. To this end, after adapting the preset values on the basis of said adaptation rule, the raw image data of the sequence are encoded again and the similarity criterion is verified again. Thus, it may be detected or verified that the video encoder is now suitable for generating encoded training data. The step of repeatedly adapting the preset values and verifying the similarity criterion may be repeated until the similarity criterion is fulfilled and/or until an interruption criterion is fulfilled. The interruption criterion may comprise that a certain amount of time and/or a certain number of tries or repetitions have been performed.

In one embodiment the selecting of the at least one sequence means that several sequences are selected. In other words, from the raw image data, several sequences are generated. The sequences may be consecutive, i.e., all the raw image data are associated with one sequence. Alternatively, each sequence may be generated after a given measuring time interval. Thus, a time difference between the end of one sequence and the beginning of the next sequence can be in the range of, e.g., 1 second to 60 minutes. Additionally or alternatively, each sequence may be generated, whenever a predefined processing resource fulfills a predefined availability criterion in said processing unit. In other words, a new sequence will be selected, whenever the processing resource for verifying the similarity criterion is available or has finished verifying the previous sequence. Additionally or alternatively, a respective sequence may be selected or generated, when the surroundings of the vehicle change. This can be detected, e.g., on the basis of a digital street map and/or from the raw image data (for example, light conditions and/or a local and/or global image contrast value may change to an amount greater than a threshold value since the last sequence was generated).

In one embodiment the encoded training data from the data storage are used for training an artificial neural network, i.e. the second artificial neural network. In other words, a second artificial neural network is trained on the basis of the stored encoded training data. The encoded training data will be decoded for this purpose. The training may be performed in a laboratory, for example. The trained second neural network is operated in an autonomously driving vehicle by providing raw image data from a camera of that autonomously driving vehicle to the second artificial neural network and obtaining real-time recognition data as a recognition result from the second neural network. The autonomously driving vehicle is controlled on the basis of the real-time recognition data. In other words, use is made of the stored encoded training data in such a way, that they provide the training data for the second neural network that is then operated in an autonomously driving vehicle for controlling the vehicle, i.e. for recognizing at least one object in the surroundings of the autonomously driving vehicle.

In one embodiment the reference recognition data (reference evaluation data) and the second recognition data (current evaluation data) respectively described an image content that has been recognized in the at least one data sequence. Such an image content can relate to, e.g., a traffic participant (vehicle, pedestrian, bicycle, motorbike), and/or an obstacle (e.g. tree, house) and/or a road infrastructure (e.g. road, traffic light, traffic sign). As the ground truth regarding the true image content that is actually represented by the raw image data is unknown, comparing the reference recognition data (reference evaluation data) and the second recognition data (current evaluation data) using the similarity criterion may be limited to verifying, whether the same or similar image content (as defined by the similarity criterion) has been recognized, independently of the ground truth image content. For example, the number of recognized objects may be compared as one aspect of the similarity criterion. Additionally or alternatively, a value of a predefined uncertainty measure regarding the image content is evaluated. Possible image measures have been discussed in the introduction of this text. Evaluating an uncertainty measure provides the advantage, that a more sensitive evaluation is possible as in comparison to evaluating a recognized image content. For example, even if the number of recognized objects may be the same in both the reference (reference recognition data) and the second recognition data (current evaluation data), the second recognition data (current evaluation data) may indicate that the uncertainty has risen. The similarity criterion may comprise a threshold indicating that the rise or the change in uncertainty must be below this threshold.

The similarity criterion may comprise the condition that a respective difference value describing a difference between the reference recognition data (reference evaluation data) and the second recognition data (current evaluation data) lies within a predefined interval. By setting the size of the interval a tolerance as regards the comparing of the recognition data may be set.

As has already been described, each selected sequence may comprise several consecutive camera images or only a single camera image. Each sequence may comprise raw image data that correspond to a video sequence of a length of, for example, 0.5 seconds to 30 seconds of continuous video.

With regard to said video encoder, in one embodiment as the video encoder and MPEG-encoder is used. The encoder may therefore be designed according to the MPEG-Standard, i.e. ISO/IEC-14496. Especially with regard to adapting said preset values of the encoder, an MPEG-encoder has proven to provide advantages adaptability for obtaining encoded training data. By encoding raw image data into encoded raw image data or encoded data, a data volume is reduced. For example, a data volume of 1 MB of raw image data may be compressed by means of a video encoder to yield 0.25 MB of encoded image data (yielding a compression rate of 0.25, i.e. output data volume/input data volume). A compression rate may be set by means of the preset value to a compression value in the range of 0.1 to 0.7. Said corresponding decoder is the decoder that reversed the encoding process. Corresponding decoders are known from the prior art.

In one aspect the invention is concerned with a processing unit that comprises at least one processor and a data memory coupled to the at least one processor, wherein the processing unit is designed to perform an embodiment of the described method according to any one of the preceding claims. The at least one processor of the processing unit may each be based on a microprocessor or microcontroller or an ASIC (application specific integrated circuit). For performing the inventive method, the data memory may comprise computer readable instructions that—when executed by the at least one processor—cause the at least one processor to perform said embodiment of the inventive method. The processing unit may be provided in a test vehicle or it may be connected to such a test vehicle over a digital communication network that may comprise the Internet and/or a cellular network. The communication network may be used to provide a communication link.

In one aspect the invention is concerned with a recording system comprising a test vehicle with a camera and comprising an embodiment of the inventive processing unit and comprising at least one video encoder for encoding raw image data of the camera for generating encoded image data and a data storage for storing the encoded image data as encoded training data. As has already been described, the encoding process is controlled by the processing unit on the basis of an embodiment of the inventive method such that only those encoded image data are stored that may be used as encoded training data.

The invention is also directed to a recording system comprising a test vehicle with a camera and comprising an embodiment of the processing unit according to the invention. Additionally, the recording system comprises a video encoder for encoding raw image data of the camera for generating encoded image data and a data storage for storing the encoded image data. As has already been described, this storing process is controlled by the processing unit on the basis of an embodiment of the inventive method such that only those encoded image data are stored that may be used as encoded training data.

In one further embodiment of the recording system, the processing unit is provided in the test vehicle. In an alternative embodiment, the processing unit and the data storage are provided outside the test vehicle and the processing unit is designed to receive raw image data from the camera of the test vehicle over a wireless communication link. The communication link may be provided on the base of a Wi-Fi-technology and/or a mobile communication technology (e.g., 4G or 5G). The processing unit and the camera (or a control unit controlling the camera in the test vehicle) may be connected on the basis of an Internet connection. Providing the processing unit and the data storage outside the vehicle provides the advantage that any vehicle comprising a camera and a communication unit for setting up the wireless communication link may be used as a test vehicle. Also, several test vehicles may be used by one processing unit.

The invention also comprises the combinations of the features of the different embodiments.

In the following an exemplary implementations of the invention are described.

The embodiments explained in the following is a preferred embodiment of the invention. However, in the embodiments, the described components of the embodiment each represent individual features of the invention which are to be considered independently of each other and which each develop the invention also independently of each other and thereby are also to be regarded as a component of the invention in individual manner or in another than the shown combination. Furthermore, the described embodiments can also be supplemented by further features of the invention already described.

In the figures identical reference signs indicate elements that provide the same function.

FIG. 1 shows a test vehicle 10 that can be, e.g., a passenger vehicle or a truck or a drone. Vehicle 10 may be performing a test drive T through a region or environment 14. Vehicle 10 may be used to obtain video encoded training data 11. To this end, vehicle 10 may comprise a video camera 12 which may provide a detection range 13 that may be directed towards the environment 14 of vehicle 10. In the environment 14, at least one object 15 may be located, e.g. a pedestrian or another vehicle. Camera 12 may generate raw image data 16 that may describe the environment 14 with the at least one object 15 as it is seen in the detection range 13. Raw image data 16 may describe a sequence or succession of several single, independent camera images in an uncompressed format. A filter may have been applied, e.g. an edge detection filter. The raw image data 16 are "raw" in the sense that they are not encoded, i.e. no block-coding, like e.g. MPEG-4, is applied.

On the basis of the raw image data 16, a processing unit 17 may generate encoded image data 18 that may be stored in a data storage 19 as the encoded training data 11. Data storage 19 may be based on at least one hard drive and/or flash drive. Processing unit 17 may comprise at least one processor 20 that may be coupled to a memory 21. The memory 21 may provide computer readable instructions that may be executed by the at least one processor 20. The test vehicle 10 with camera 12, processing unit 17 and data storage 19 together may constitute a recording system S for encoded training data 11.

Figure 2:
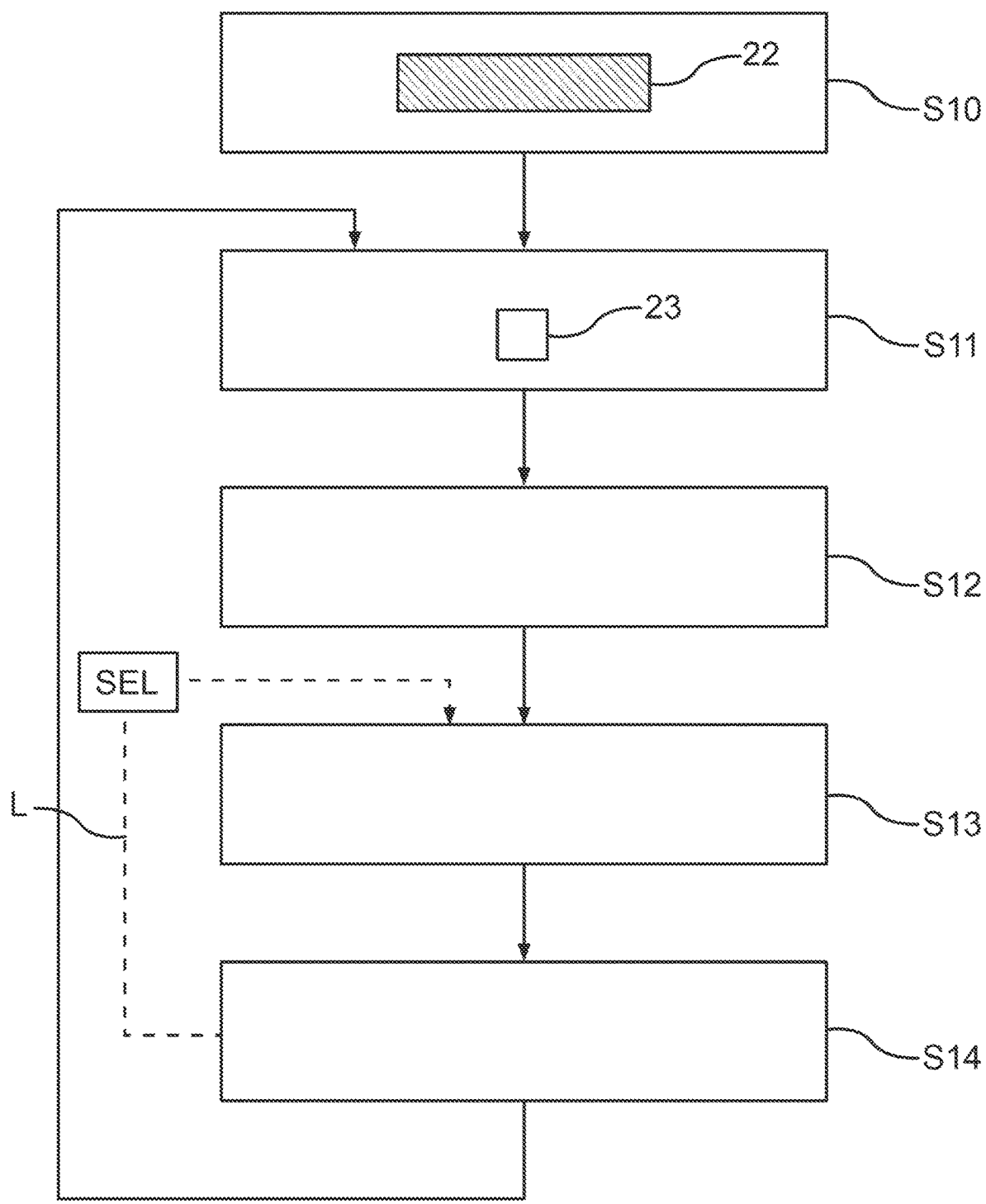
FIG. 2 is a schematic illustration of a driving situation.

For generating the encoded image data 18 out of the raw image data 16, processing unit 17 may perform a method as it is described in the following on the basis of FIG. 1 and FIG. 2. FIG. 2 illustrates in a flow chart the steps of the method.

In a step S10, processing unit 17 may receive the raw image data 16 resulting in received raw image data 22. Receiving the raw image data 16 may be performed continuously while the following steps are performed.

In a step S11, a predefined event, e.g. after a predefined time interval and/or when a change in environmental conditions is detected, it may be verified by the following steps, whether the encoding of the raw image data 22 still yields suitable encoded training data 11. If this is not the case anymore, the encoder or at least one of its preset values may be changed in order to adapt the encoding to the current environment such that the encoding yields suitable encoded training data 11. For each verification, a set of currently available raw image data 22 may be used, e.g. the predefined most recent raw image data 22 of a predefined data volume or a predefined number of images (e.g. the recent 100 images or the recent 10 images). This selection of raw image data 22 is called a raw image data sequence 23.

In the step S11, from the received raw image data 22 the at least one sequence 23 is selected, i.e. a subset of consecutively received raw image data 16 is selected as a sequence 23.

It is then verified in the following steps for each selected sequence 23, whether the currently received raw image data 22 can be encoded in such a manner that they are suitable for storing in the data storage 19 as encoded training data.

To this end, in a step S12, the raw image data of the selected sequence 23 is provided to an artificial neural network 24 (ANN) which performs a first test recognition or image recognition 25 on the raw image data 22. The artificial neural network 24 may have been trained on raw image training data, i.e. it is not configured to compensate for coding artifacts (like block artifacts and/or blurring). The test recognition or image recognition 25 results in reference recognition data that constitute reference recognition data or reference evaluation data 26 describing what image content the artificial neural network 24 detected in the raw image data of the sequence 23. For example, the reference recognition result according to the reference evaluation data or reference recognition data 26 may indicate that the at least one object 15 is detected or recognized in the environment 14. Additionally or alternatively, the reference evaluation data or reference recognition data 26 may indicate an uncertainty of the artificial neural network 24 regarding the image recognition 25 and/or it may indicate activation values of at least one layer of the artificial neural network 24. Appropriate uncertainty measures for artificial neural networks are known from the prior art.

In a step S13, the raw image data of sequence 23 may be fed into or provided to a video image encoder or video encoder 27 which may generate an encoded sequence or encoded image data 28 from the sequence 23. Video encoder 27 may be configured on the basis of preset values 27'. The encoded image data 28 as contained in the encoded sequence may be decoded by a decoder that corresponds to or provides the inverse function of the current video image encoder or video encoder 27 and the decoded sequence or decoded image data may be provided to the artificial neural network 24 which may perform a second test recognition or image recognition 29' on the basis of the encoded image data 28. This may result in a second recognition result described by second or current recognition or evaluation data 29. These current recognition or evaluation data 29 may in the same way as the reference recognition data or reference evaluation data 26 refer to the recognition result in regard to the at least one object 15 that may have been detected or recognized by the artificial neural network 24 in the environment 14. Additionally or alternatively, the described uncertainty and/or the activation level may be quantified. The reference evaluation data or reference recognition data 26 and the current evaluation data 29 especially describe the same quantities.

In a step S14, it may be verified whether the reference evaluation data or reference recognition data 26 and the current evaluation data 29 fulfill a predefined similarity criterion 30.

The similarity criterion 30 may comprise that a difference value 31 is calculated on the basis of the reference recognition data or reference evaluation data 26 and the current evaluation data 29. For example, the number of recognized objects and/or a respective value quantifying the uncertainty and/or the activation level may be provided by both the reference evaluation data or reference recognition data 26 and the current evaluation data 29. The corresponding values may be subtracted from each other and, optionally, the absolute value may be calculated. The similarity criterion 30 may further comprise that in the case that the difference value 31 is smaller than a predefined threshold value or lies within a predefined interval 32, storing of encoded image data 18 may be performed and/or further use of the encoder 27 and/or the preset value 27' is made for further encoding the incoming raw image data 22.

In FIG. 1 this is symbolized by a switch 32' which, when closed, may let pass encoded image data 18 to the data storage 19, and which, when opened, may block storing into the data storage 19. However, this is only a symbol for visualizing the effect. The encoded image data 18 may be generated on the basis of encoder 27 using the preset values 27'.

In the case that the similarity criterion cannot be fulfilled, a selection loop L may be performed.

In a predefined selection step SEL another current encoder 27 and/or other preset values from a predefined set of possible encoders and/or a new current preset value 27' from a predefined set of possible preset values for the current encoder 27 is selected and then the selection loop L the steps S14 may repeated. Thus, an encoder 27 and/or a preset value 27' that fulfil the similarity criterion 30 may be found for the current environmental condition (e.g. lighting condition and/or visibility condition).

Additionally to blocking the encoded image data 18 in the case that the similarity criterion cannot be fulfilled by any available possible encoder and/or any available possible preset value, the un-encoded or raw image data may be forwarded to the data storage 19 for storing. Thus, a choice is made between encoded image data 18 and raw image data 22, depending on the result of applying the similarity criterion 30.

Then, the method may continue by selecting a next sequence 23 of received raw image data 22 for verifying, whether the similarity criterion 30 is still fulfilled. To this end, at least one of the described events may trigger the step S11.

As is further illustrated in FIG. 1, on the basis of the stored encoded training data 11, at a later point in time, in another processing unit 33, a new artificial neural network 34' (i.e. a second artificial neural network) may be trained by providing both the encoded training data 11 and corresponding labelling data 35 to the second artificial neural network 34' while the second artificial neural network 34' is trained on the basis of a machine learning algorithm as it can be obtained from the prior art. The labelling data 35 may describe a true image content as it may be contained in the stored encoded training data 11.

The trained second artificial neural network 34' may then be provided in a vehicle 36 which may operate the trained second artificial neural network 34' in order to perform an object recognition on the basis of raw image data 37 provided by a camera 38 of the vehicle 36. As a result, recognition result data 39 may be generated which may be used to control an autonomous driving system 40 of vehicle 36. The autonomous driving system 40 may perform driving D the vehicle 36 autonomously.

The recording of video data for training artificial neural networks is thus made possible. For storing the video data on limited disc space, the use of an encoding algorithm (e.g. MPEG-4) is necessary. However, encoding image data is a "lossy" process, i.e. the encoded camera images might contain artifacts from the encoding. This may influence the training of the neural network later on. The described method offers an iterative algorithm for finding suitable parameter values for encoding video data such that no significant impairment on the quality of the training is caused. The advantage is that only image data are encoded and stored that lead to similar recognition result values as non-encoded image data.

Figure 3:
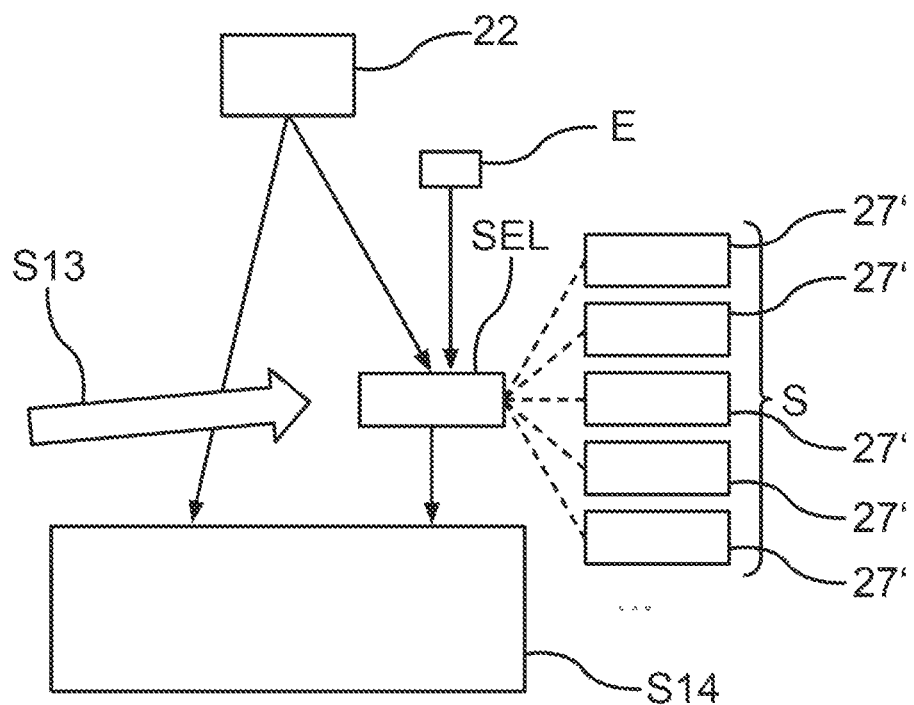
FIG. 3 is a diagram for illustrating one embodiment of the inventive method.

FIG. 3 illustrates how the processing unit detects a change in environmental condition of the test vehicle on the basis of environmental data E and/or on the basis of the current raw image data 22 and/or in the selection step SEL. If a predefined change in the environmental condition is detected during the recording of the training data, a predefined switching procedure for adapting the encoding to the current environmental conditions is performed. Another encoder and/or preset values 27' from a predefined set S of possible preset values be selected.

Sets for preset values 27' can be, for example: "night encoder" for driving at night, "city encoder" for driving in city traffic, "snow encoder" for driving in a snowy landscape, and/or at least one machine selected encoder for at least one environmental condition. Correspondingly, the step SEL can be the selection of the best suitable encoder depending on a selection criterion. For example, the current environmental condition can be estimated based on environmental features shown in the image. The Step S13 can prepare this selection step SEL by encoding and decoding at least one image and provide it to the selection criterion. Alternatively, the raw image can be used. The step S14 then can apply the described ANN selection criteria to assess whether the encoder is still suitable.

The example shows how a recording process for neural network training data can be controlled and how an adaptive encoding scheme for generating encoded training data can be provided.

The invention is also directed to the following items:

Item 1: A method for generating encoded training data (11) for machine learning, wherein a processing unit (17) performs the following steps for generating the encoded training data (11) and for storing them into a data storage (19) during a test drive (T) of a test vehicle (10) that carries a camera (12) that is generating raw image data (16):

receiving the raw image data (16) from the camera (12) and operating an artificial neural network, ANN, that has been trained on raw image training data and performing a recognition test on the basis of at least one data sequence of the received raw image data using the ANN and thereby generating respective reference evaluation data (reference recognition data) on the basis of a predefined evaluation rule, characterized in that for each data sequence it is tested, if a given encoder is suitable for encoding the raw image data for generating the encoded training data for a training of a second artificial neural network (34'), by performing a testing procedure comprising that the respective data sequence of the raw image data is encoded with the encoder and then the encoded image data is decoded with a corresponding decoder and the recognition test is performed on the decoded image data yielding current evaluation data and the processing unit verifies, if the current evaluation data and the respective corresponding reference evaluation data (reference recognition data) fulfill a predefined similarity criterion.

Item 2. A method according to item 1, wherein the testing procedure comprises performing the following step in a selection loop:

encoding the raw image data with a current encoder that is selected from a predefined set of possible encoders and/or with a current preset value that is selected from a predefined set of possible preset values for a respective encoding parameter for the current encoder, decoding the encoded testing data and performing the recognition test for the decoded testing data using the ANN and thereby generating current evaluation data on the basis of the evaluation rule, verifying whether the current evaluation data fulfill the predefined similarity criterion with regard to the reference evaluation data (reference recognition data), if the similarity criterion is fulfilled, the selection loop is interrupted and the current encoder and the current preset value is used for generating encoded training data by encoding the received and/or future raw image data for a future time interval during the test drive, else if the similarity criterion is un-fulfilled, a predefined selection step for selecting another encoder and/or other preset values is performed and the selection loop is repeated.

Item 3: A method according any of the preceding items, wherein the processing unit repeatedly detects an environmental condition in an environment of the test vehicle on the basis of environmental data and if a predefined change in the environmental condition is detected during the recording of the training data, a predefined switching procedure for adapting the encoding to the current environmental conditions is performed, wherein the switching procedure preferably comprises that a. several possible environmental conditions are each associated with a respective encoder from the set of encoders and/or with a respective preset value from set of possible environmental set values and if the current environmental condition matches one of the possible environmental conditions, the associated encoder and/or preset value is used for the further encoding, and/or b. the selection loop (according to item 2) is started.

Item 4: A method according to any of the preceding items, wherein the evaluation rule comprises that a full recognition result is comprised in the evaluation data and the similarity criterion comprises that a predefined percentage of the recognition statistics must agree.

Item 5: A method according to any of the preceding items, wherein the evaluation rule comprises that activation values of at least one hidden layer of the ANN and/or an uncertainty level of the artificial neural network are comprised in the evaluation data and the similarity criterion comprises that a difference in reaction of the ANN to the encoded image data in comparison to the raw image data is below a predefined threshold.

Item 6: A method according to any of the preceding items, wherein the selection step comprises that the selection of the current preset value is based on a gradient descent algorithm, and/or wherein the selection step is based on multi-pass encoding, wherein:

c. in a first pass: an activation level of the ANN for single sequences of camera images is recorded, d. in one or several following passes: the preset value is varied such that an influence on those images or sequences with low activation level is increased.

Item 7: A method according to any of the preceding items, wherein the testing procedure comprises:

performing a first image recognition (25) on the data sequence (23) using an artificial neural network (24) that is trained to recognize at least one object (15) on the basis of the received raw image data (22);

obtaining reference recognition data (26) as a result of performing the first image recognition (25);

encoding the data sequence (23) using a video encoder (27) that is configured with given preset values (27'), wherein the encoding results in an encoded sequence (28);

decoding the encoded sequence (28) and performing a second image recognition (29') on the decoded sequence (28) using the artificial neural network (24);

obtaining second recognition data (29) as a result of performing the second image recognition (29'); and if the second recognition data (29) and the reference recognition data (26) fulfill a predefined similarity criterion (30), storing the encoded sequence (28) and/or encoding further received raw image data (22) and storing the encoded further image data (18) as the encoded training data (11) in the data storage (19).

Item 8: A method according to item 7, comprising the following step:

if and/or while the similarity criterion (30) is not fulfilled, an already ongoing storing of encoded image data (18) is interrupted or raw image data are stored in the data storage (19).

Item 9: A method according to item 7 or 8, wherein if the similarity criterion (30) is not fulfilled, the preset values (27') are adapted according to a predefined adaptation rule, wherein after adapting the preset values, the raw image data of the sequence are preferably encoded again and the similarity criterion is verified again.

Item 10: A method according to any of the items 7 to 9, wherein several sequences (23) are selected, each after a given measuring time interval and/or whenever predefined processing resource fulfills a predefined availability criterion in the processing unit and/or when surroundings of the vehicle change.

Item 11: A method according to any of the preceding items, wherein the second artificial neural network (34) is trained on the basis of the stored encoded training data (11) and the trained second neural network (34) is operated in an autonomously driving vehicle (36) by providing raw image data (37) from a camera (38) of the autonomously driving vehicle (36) to the second artificial neural network (34) and obtaining real-time recognition data (39) as a recognition result from the second neural network (34) and controlling the autonomously driving vehicle (36) on the basis of the real-time recognition data (39).

Item 12: A method according to any of the preceding items, wherein the reference recognition data (26) and the second recognition data (29) each describe an image content that has been recognized in the at least one data sequence (23) and/or a value of a predefined uncertainty measure regarding the image content, and wherein the similarity criterion (30) comprises the condition that a respective difference value (31) describing a difference between the reference recognition data (26) and the second recognition data (29) lies within a predefined interval (32).

Item 12: A processing unit (17) comprising at least one processor (20) and a data memory (21) coupled to the at least one processor (20), wherein the processing unit (17) is designed to perform a method according to any one of the preceding items.

Item 13: A recording system (S) comprising a test vehicle (10) with a camera (12) and comprising a processing unit (17) according to item 12 and comprising a video encoder (27) for encoding raw image data (22) of the camera (12) for generating encoded image data (28) and a data storage (19) for storing the encoded image data as encoded training data (11).

Item 14: A recording system according to item 13, wherein the processing unit is provided in the test vehicle or wherein the processing unit and the data storage are provided outside the test vehicle and the processing unit is designed to receive raw image data from the camera of the test vehicle over a wireless communication link.

The invention claimed is:

1. A method for generating encoded training data, wherein a processing unit performs the following steps for generating the encoded training data and for storing them into a data storage during a test drive of a test vehicle that carries a camera that is generating raw image data:
   receiving the raw image data from the camera and operating a first artificial neural network (ANN) that has been trained on raw image training data and that is trained to recognize at least one object on the basis of raw image data, and
   performing an image recognition on the basis of at least one data sequence of the received raw image data using the first artificial neural network and thereby generating respective reference recognition data on the basis of a predefined evaluation rule, wherein the reference recognition data describe (i) first image content that has been recognized in the at least one data sequence, (ii) activation values of at least one hidden layer of the first ANN and/or (iii) a value of a predefined uncertainty measure regarding the first image content, and wherein the evaluation rule determines what type of recognition data shall be used, wherein for each data sequence of the raw image data it is tested, if a given video encoder is suitable for encoding the raw image data for generating the encoded training data for a training of another, a second artificial neural network, by performing a testing procedure comprising:
   performing the first image recognition on the data sequence using the first artificial neural network;
   obtaining the reference recognition data as a result of performing the first image recognition;
   encoding the data sequence using the given video encoder that is configured with given preset values, wherein the encoding results in an encoded sequence, and then
   decoding the encoded sequence using a corresponding decoder and
   performing a second image recognition on the decoded sequence using the first artificial neural network;
   obtaining current evaluation data as a result of performing the second image recognition and on the basis of the evaluation rule, wherein the current evaluation data describe second image content that has been recognized in the at least one data sequence, activation values of at least one hidden layer of the first ANN and/or a value of a predefined uncertainty measure regarding the second image content; and
   the processing unit verifies, if the current evaluation data and the respective corresponding reference recognition data fulfill a predefined similarity criterion, wherein the similarity criterion comprises the condition that a respective difference value describing a difference between the reference recognition data and the current evaluation data lies within a predefined interval, and
   if the current evaluation data and the reference recognition data fulfill the predefined similarity criterion, storing the encoded sequence and/or encoding further received raw image data and storing the encoded further image data as the encoded training data in the data storage;
   wherein if the similarity criterion is not fulfilled, the preset values are adapted according to a predefined adaptation rule, wherein the adaptation rule comprises that a stepwise increase or decrease of at least one parameter value of the preset values is performed and/or the adaptation rule comprises that the preset values are adapted as a function of the current evaluation data and wherein after adapting the preset values, the raw image data of the sequence are encoded again and the similarity criterion is verified again.

2. The method according to claim 1, wherein if the similarity criterion is not fulfilled, an already ongoing storing of encoded image data is interrupted until the next data sequence is detected that fulfils the similarity criterion again or raw image data are stored in the data storage.

3. The method according to claim 1, wherein the testing procedure comprises performing the following steps in a selection loop:
   encoding the raw image data of the sequence with the given video encoder that is selected from a predefined set of possible encoders and/or with a current preset value that is selected from a predefined set of possible preset values for a respective encoding parameter for the given video encoder yielding encoded image data, decoding the encoded image data and performing the image recognition for the decoded image data using the first ANN and thereby generating current evaluation data on the basis of the evaluation rule, verifying whether the current evaluation data fulfill the predefined similarity criterion with regard to the reference recognition data, and if the similarity criterion is fulfilled, the selection loop is interrupted and the given video encoder with the respective current preset value is used for generating encoded training data by encoding the received and/or future raw image data for a future time interval during the test drive, else if the similarity criterion is un-fulfilled, a predefined selection step for selecting another video encoder and/or other preset values is performed and the selection loop is repeated.

4. The method according to claim 3, wherein the selection step comprises that the selection of the current preset value is based on a gradient descent algorithm, and/or wherein the selection step is based on multi-pass encoding, wherein:
  a. in a first pass: an activation level of the first ANN for single sequences of camera images is recorded, and
  b. in one or several following passes: the preset value is varied such that an influence on those images or sequences with low activation level is increased.

5. The method according to claim 3, wherein:
the processing unit repeatedly detects an environmental condition in an environment of the test vehicle on the basis of environmental data, wherein the environmental condition comprises a lighting condition and/or visibility condition and/or sunshine and/or rain and/or fog and/or a specific brightness value of the light and/or angle of incidence of the light, and when a predefined change in the environmental condition is detected during the recording of the training data, a predefined switching procedure for adapting the encoding to the current environmental conditions is performed, wherein the switching procedure comprises that the selection loop according to claim 3 is started.

6. The method according to claim 1, wherein:
the processing unit repeatedly detects an environmental condition in an environment of the test vehicle on the basis of environmental data, wherein the environmental condition comprises a lighting condition and/or visibility condition and/or sunshine and/or rain and/or fog and/or a specific brightness value of the light and/or angle of incidence of the light, and if a predefined change in the environmental condition is detected during the recording of the training data, a predefined switching procedure for adapting the encoding to the current environmental conditions is performed, wherein the switching procedure comprises that:

a. several possible environmental conditions are each associated with a respective video encoder from a set of video encoders and/or with a respective preset value from a set of possible environmental set values, and b. if the current environmental condition matches one of the possible environmental conditions, the associated video encoder and/or preset value is used for the further encoding.

7. The method according to claim 1, wherein the similarity criterion states that a predefined percentage value of predefined objects detected on the basis of the raw image data must also be detected on the basis of the encoded image data.

8. The method according to claim 1, wherein the evaluation rule comprises that activation values of at least one hidden layer of the first ANN and/or an uncertainty level of the first artificial neural network are comprised in the evaluation data and the similarity criterion comprises that a difference in reaction of the first ANN to the encoded image data in comparison to the raw image data is below a predefined threshold.

9. The method according to claim 1, wherein several sequences are selected:
after a given measuring time interval,
predefined processing resource fulfills a predefined availability criterion in the processing unit, such that a new sequence will be selected, whenever the processing resource for verifying the similarity criterion is available or it has finished verifying the previous sequence, or
when surroundings of the vehicle change.

10. The method according to claim 1, wherein:
the second artificial neural network is trained on the basis of the stored encoded training data, and
the trained second neural network is operated in an autonomously driving vehicle by providing raw image data from a camera of the autonomously driving vehicle to the second artificial neural network and obtaining real-time recognition data as a recognition result from the second neural network and controlling the autonomously driving vehicle on the basis of the real-time recognition data.

11. A processing unit comprising at least one processor and a data memory coupled to the at least one processor, wherein the processing unit is designed to:
receive raw image data from a camera;
operate a first artificial neural network (ANN) that has been trained on raw image training data and that is trained to recognize at least one object on the basis of raw image data, and
perform an image recognition on the basis of at least one data sequence of the received raw image data using the first ANN and thereby generating respective reference recognition data on the basis of a predefined evaluation rule, wherein the reference recognition data describe first image content that has been recognized in the at least one data sequence and/or activation values of at least one hidden layer of the first ANN and/or a value of a predefined uncertainty measure regarding the first image content, and wherein the evaluation rule determines what type of recognition data shall be used, wherein for each data sequence of the raw image data it is tested, if a given video encoder is suitable for encoding the raw image data for generating the encoded training data for a training of another, a second artificial neural network, by performing a testing procedure comprising:
perform the first image recognition on the data sequence using the first artificial neural network;
obtain the reference recognition data as a result of performing the first image recognition;
encode the data sequence using the video encoder that is configured with given preset values, wherein the encoding results in an encoded sequence, and then
decode the encoded sequence using a corresponding decoder and perform a second image recognition on the decoded sequence using the first artificial neural network;

obtain current evaluation data as a result of performing the second image recognition and on the basis of the evaluation rule, wherein the current evaluation data describe second image content that has been recognized in the at least one data sequence and/or activation values of at least one hidden layer of the first ANN and/or a value of a predefined uncertainty measure regarding the second image content; and the processing unit verifies, if the current evaluation data and the respective corresponding reference recognition data fulfill a predefined similarity criterion, wherein the similarity criterion comprises the condition that a respective difference value describing a difference between the reference recognition data and the current evaluation data lies within a predefined interval, and if the current evaluation data and the reference recognition data fulfill the predefined similarity criterion, store the encoded sequence and/or encoding further received raw image data and storing the encoded further image data as the encoded training data in the data storage;

wherein if the similarity criterion is not fulfilled, the preset values are adapted according to a predefined adaptation rule, wherein the adaptation rule comprises that a stepwise increase or decrease of at least one parameter value of the preset values is performed and/or the adaptation rule comprises that the preset values are adapted as a function of the current evaluation data and wherein after adapting the preset values, the raw image data of the sequence are encoded again and the similarity criterion is verified again.

12. A recording system comprising a test vehicle with a camera and comprising:

a processing unit;

a video encoder for encoding raw image data of the camera and for generating encoded image data; and a data storage for storing the encoded image data as encoded training data;

wherein the processing unit performs the following steps for generating encoded training data and for storing them into a data storage during a test drive of the test vehicle:

receiving raw image data from the camera;

operating a first artificial neural network (ANN) that has been trained on raw image training data and that is trained to recognize at least one object on the basis of raw image data; and performing an image recognition on the basis of at least one data sequence of the received raw image data using the first artificial neural network and thereby generating respective reference recognition data on the basis of a predefined evaluation rule, wherein the reference recognition data describe first image content that has been recognized in the at least one data sequence and/or activation values of at least one hidden layer of the first ANN and/or a value of a predefined uncertainty measure regarding the first image content, and wherein the evaluation rule determines what type of recognition data shall be used, wherein for each data sequence of the raw image data it is tested, if a given video encoder is suitable for encoding the raw image data for generating the encoded training data for a training of another, a second artificial neural network, by performing a testing procedure comprising:

performing the first image recognition on the data sequence using the first artificial neural network;

obtaining the reference recognition data as a result of performing the first image recognition;

encoding the data sequence using the video encoder that is configured with given preset values, wherein the encoding results in an encoded sequence, and then decoding the encoded sequence using a corresponding decoder and performing a second image recognition on the decoded sequence using the first artificial neural network;

obtaining current evaluation data as a result of performing the second image recognition and on the basis of the evaluation rule, wherein the current evaluation data describe second image content that has been recognized in the at least one data sequence and/or activation values of at least one hidden layer of the first ANN and/or a value of a predefined uncertainty measure regarding the second image content; and the processing unit verifies, if the current evaluation data and the respective corresponding reference recognition data fulfill a predefined similarity criterion, wherein the similarity criterion comprises the condition that a respective difference value describing a difference between the reference recognition data and the current evaluation data lies within a predefined interval, and if the current evaluation data and the reference recognition data fulfill the predefined similarity criterion, storing the encoded sequence and/or encoding further received raw image data and storing the encoded further image data as the encoded training data in the data storage; and wherein if the similarity criterion is not fulfilled, the preset values are adapted according to a predefined adaptation rule, wherein the adaptation rule comprises that a stepwise increase or decrease of at least one parameter value of the preset values is performed and/or the adaptation rule comprises that the preset values are adapted as a function of the current evaluation data and wherein after adapting the preset values, the raw image data of the sequence are encoded again and the similarity criterion is verified again.

13. The recording system according to claim 12, wherein the processing unit is provided in the test vehicle.

14. The recording system according to claim 12, wherein the processing unit and the data storage are provided outside the test vehicle and the processing unit is designed to receive raw image data from the camera of the test vehicle over a wireless communication link.

* * * * *